United States Patent

Von Recklinghausen

[15] 3,662,113

[45] May 9, 1972

[54] STEREOPHONIC DEMODULATOR APPARATUS AND AUTOMATIC MONOPHONIC-STEREOPHONIC SWITCHING CIRCUIT

[72] Inventor: Daniel R. Von Recklinghausen, Arlington, Mass.

[73] Assignee: H. H. Scott, Inc., Maynard, Mass.

[22] Filed: Mar. 27, 1968

[21] Appl. No.: 716,449

[52] U.S. Cl. ..........................179/15 BT, 325/348, 325/478, 325/456, 307/251

[51] Int. Cl. ..........................H04h 5/00

[58] Field of Search ..........179/15 ST; 307/304, 205, 251; 325/348, 478, 456

[56] References Cited

UNITED STATES PATENTS

| | | | |
|---|---|---|---|
| 3,387,296 | 6/1968 | Epstein | 340/186 |
| 3,258,537 | 6/1966 | Proctor | 179/15 |
| 3,152,224 | 10/1964 | Cotsworth | 179/15 |
| 3,466,399 | 9/1969 | Dias | 179/15 |

OTHER PUBLICATIONS

Crystalonics " Application Notes" Nov. 1965

" FM Stereo Circuit Developments" Radio–Electronics, February 1962, by Norman H. Crowhurst " Field Effect Transistors" Part 3, Electronics, Dec. 28, 1964

*Primary Examiner*—Kathleen H. Claffy

*Assistant Examiner*—Thomas J. D'Amico

*Attorney*—Rines & Rines and Shapiro & Shapiro

[57] ABSTRACT

This disclosure deals with stereophonic demodulator apparatus using field effect transistors that eliminate the need for critically balanced bridge detector elements and additionally serve automatically as monophonic-stereophonic transientless switching circuits.

10 Claims, 9 Drawing Figures

INVENTOR
DANIEL R. vonRECKLINGHAUSEN

BY Rines and Rines

ATTORNEYS

INVENTOR
DANIEL R. vonRECKLINGHAUSEN
BY Rines and Rines
ATTORNEYS

INVENTOR
DANIEL R. von RECKLINGHAUSEN

BY Rines and Rines
ATTORNEYS

INVENTOR
DANIEL R. vonRECKLINGHAUSEN

BY Rines and Rines
ATTORNEYS

STEREOPHONIC DEMODULATOR APPARATUS AND AUTOMATIC MONOPHONIC-STEREOPHONIC SWITCHING CIRCUIT

The present invention relates to stereophonic demodulator apparatus, and also to automatic monophonic-stereophonic switching circuits where additionally desired.

In my earlier U.S. Pat. No. 3,175,040, a widely used balanced stereophonic demodulator apparatus is disclosed employing bridge-connected diode demodulator circuits which, as described in my U.S. Pat. No. 3,296,379, may be modified simultaneously to enable monophonic-stereophonic automatic switching. Such stereophonic broadcast signals are generally of the type described, for example, in my article "-Stereophonic FM Receivers and Adaptors" appearing in the Institute of Radio Engineers Transactions on Broadcast and Television Receivers BTR 7, No. 3, November 1961, embodying a modulated main-channel monophonic signal component comprising the sum of the left and right channel signals, a 38 kHz double sideband suppressed carrier amplitude-modulation sub-channel signal serving as a sub-carrier and in turn modulated by the difference between the left and right channel signals, and a 19 kHz synchronizing pilot signal. Such previously mentioned diode bridge demodulator circuits serve to eliminate the sub-carrier frequency containing the sub-channel signal component, with the diode bridge being switched by a locally generated reinsert sub-carrier oscillation of the sub-carrier frequency. The use of such diode balanced bridges for stereophonic demodulation inherently requires that there be provided across each diode a reverse voltage in order to prevent the passage of the composite received stereophonic signal voltage through any of the diodes during half the cycle of the 38 kHz insert oscillations, with this reverse voltage being in excess of the peak composite signal voltage to prevent deleterious forward biasing of the diodes. On the half cycle of the reinsert oscillations, the forward-biased diode current derived from the application of the reinsert oscillations must be in excess of the peak composite signal current in order to prevent a reverse bias condition that may result in signal blocking. In order, moreover, to suppress the undesired appearance of reinsert oscillations in the output of the demodulator bridge circuit, the bridge circuit required the use of at least two diodes, or the equivalent, in each channel, and the application of the reinsert oscillations in push-pull to effect appropriate cancellation; the balancing of the bridge resistance, voltages and currents being rather critical.

According to the present invention, it has been discovered that a somewhat different kind of operation than occurs with rectifying diode bridges may be employed, as with the use of appropriate field effect transistors, not only to simplify the circuit and number of components required, but to obviate the necessary bridge balance criticality and to eliminate the balanced reverse and forward bias voltage requirements that have heretofore been inherent in bridge demodulators of the above-described character.

It has also been discovered that with a further modification of the field effect transistor stereophonic demodulator circuit it is possible to insure absence of output from the two pairs of stereophonic audio output terminals whenever the signal-to-noise ratio of the received signal falls below a certain predetermined level, with switching from audio output to no output occurring without the need for prior complex muting circuits requiring rather critically balanced component values and without any muting transients which have heretofore been inherent in such muting circuits.

According to the present invention, not only have these muting transients been eliminated, but the muting for the pair of stereophonic audio outputs of the multiplex demodulator circuit has been accomplished using only a single additional field effect transistor void of prior art circuits embodying a multiplicity of diodes and phase-inverters.

An object of the present invention, thus, is to provide a new and improved stereophonic or similar demodulating circuit that obviates the previously mentioned limitations and disadvantages of prior bridge demodulator circuits and, in addition, provides a new and improved demodulator circuit.

While the circuits of my said prior U.S. Letters Patent have gone a long way toward reducing transients generated in switching between stereophonic and monophonic composite signal reception, it has been found that the present invention produces no detectable switching transients of this character, thus providing a remarkably improved result.

An additional object of the invention, accordingly, is to provide an improved monophonic-stereophonic switching circuit that shares components with the stereophonic demodulating circuit, as well.

In summary, the invention attains these aims through the use of a pair of field effect transistors, one connected between its source and drain electrodes in each amplifier circuit between the detector of the composite signal receiver and the output audio amplifier channel circuits and with the gate electrodes controlled by oscillations from the sub-carrier reinsert generator adjusted to a value in excess of the sum of the pinch-off voltage of the field effect transistors and the peak composite signal voltage.

A further object of the invention, accordingly, is to provide an improved muting circuit that shares components with the above-mentioned improved monophonic-stereophonic switching circuit and the stereophonic demodulating circuit as well, making use of a single field effect transistor with its source and drain electrodes connected between one of the output terminals of the detector of the composite signal receiver and one of the composite signal input terminals of the stereophonic demodulator circuit, and with the gate electrode of the field effect transistor controlled by a direct voltage varying between essentially zero and a value in excess of the sum of the pinch-off voltage of the field effect transistor and the peak composite signal voltage; this direct voltage being developed by a filter-noise amplifier-rectifier combination which controls the automatic monophonic-stereophonic switching circuit as well.

Other and further objects will be explained hereinafter and more particularly delineated in the appended claims.

The invention will now be described in connection with the accompanying drawings, FIG. 1 of which is a combined block and schematic circuit diagram of a preferred embodiment of the stereophonic demodulator circuit of the present invention;

Figure 1:
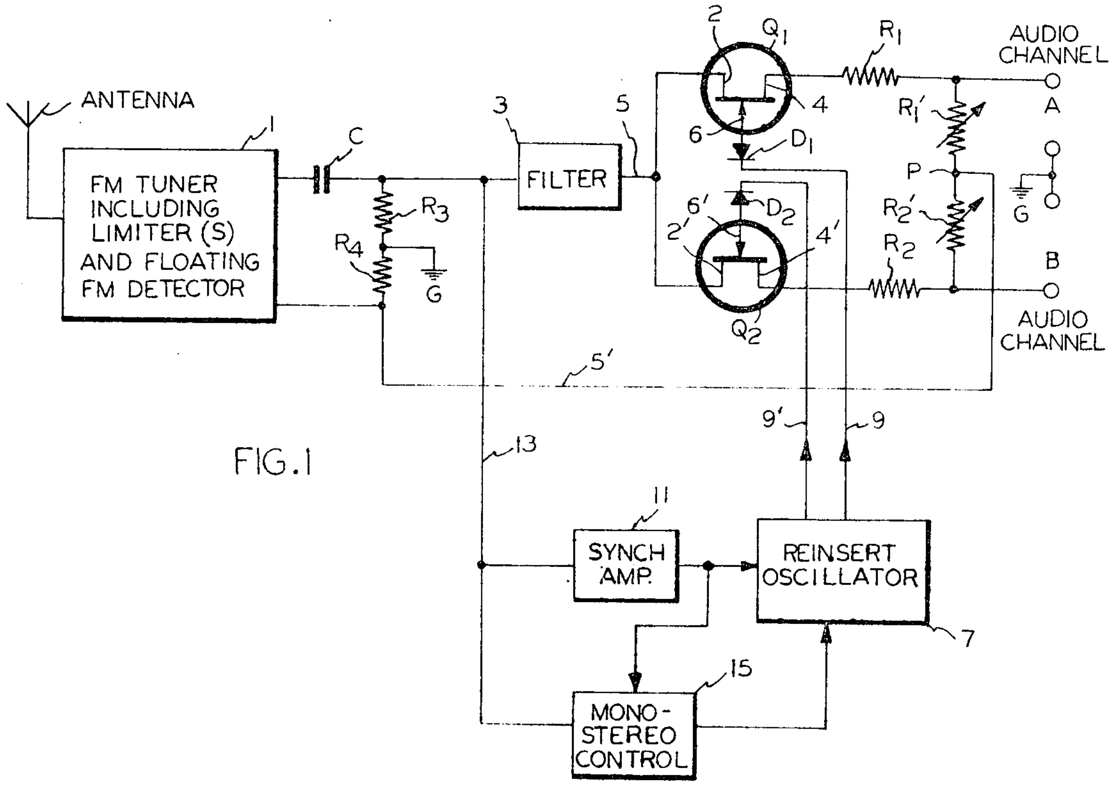

Referring to FIG. 1, and, for purposes of illustration describing the invention in connection with its preferred application to stereophonic and monophonic signal reception, though it is clearly useful with other types of signals, a conventional frequency-modulation tuner including limiting and FM detecting stages is shown at 1., receiving, for example, broadcast stereophonic transmissions by way of an antenna, so-labelled. The detected main and sub-channel signals are applied through a coupling capacitor C to a low-pass filter 3 for removing noise components above the highest frequency of interest; namely, about 53 kHz. The output signal of filter 3 travels by way of conductor 5 to the respective drain electrodes 2 and 2′ of a pair of field effect transistors Q1 and Q2 comprising a multiplex demodulator circuit. In this embodiment, field effect transistors Q1 and Q2 are provided also with source electrodes 4 and 4′ and gate electrodes 6 and 6′, and may be of the N-channel-junction field-effect transistor type.

It is to be understood, moreover, that while separate field effect transistors of such type are illustrated, clearly integrated circuit devices performing substantially the same function or other similar switching elements may be employed.

The source electrodes 4 and 4' are in turn connected through respective summing network resistors R1 and R2 in the input circuits of the right and left audio channel amplifier circuits, labelled A and B, respectively. Connected between the other or right-hand terminals of resistors R1 and R2 is a pair of adjustable shunt connected resistors R1' and R2', the connection P between which, receives the composite detected signal provided by the FM tuner 1, but with signal polarity opposite to that applied by filter 3 to the drain electrodes 2 and 2'. This opposite polarity results from the connection 5' that is taken from the lower side of resistor R4 in the intermediately grounded resistor network R3–R4 shunting the output from the detector stages of the FM tuner 1. The FM detector is preferably floating, as indicated, to enable this push-pull composite signal application at 5 and 5'.

Resistors R1' and R2' are adjusted to achieve proper separation of the stereophonic signals because the demodulating efficiency for monophonic and stereophonic signals is not equal, as is discussed in my aforementioned article in the IRE Transactions.

A 38-kHz reinsert oscillator or other source or generator of these oscillations is shown in 7 applying push-pull outputs along conductors 9 and 9' through forward bias-preventing diodes D1 and D2 to the gate electrodes 6 and 6' of the respective field effect transistors Q1 and Q2. As discussed in the later of my previously mentioned U.S. Letters Patent, the reinsert oscillation circuit 7 is controlled from a synchronizing amplifier 11, in turn connected with the output of the FM tuner detector 1 at 13, said synchronizing amplifier 11 containing the required selective circuits, as is well known, to extract the pilot frequency from the composite signal as provided by the FM tuner. As further discussed in my said U.S. Letters Patent, a mono-stereo control circuit 15 of any well-known type may also be employed to disable the reinsert oscillation generation at 7 and thus the application of such oscillations to the gate electrodes 6 and 6' of the field effect transistors Q1 and Q2 at the time that monophonic signals only are desired to be received. This control circuit 15, in its simplest form, may indeed comprise merely a switch to open circuit the reinsert oscillation stage 7.

It will be recognized that the use of the field effect transistors Q1 and Q2 in this type of circuit connection is strikingly different from the balanced bridge arrangement of at least four diodes described in my said U.S. Letters Patent. The operation is also different from the switching rectifying operation of these diodes and is predicated upon entirely different properties of field effect transistors. Specifically, a different type of voltage-control operation is effected making use of the property of field effect transistors, as distinguished not only from diodes but from ordinary transistors of the bi-polar variety. This different operation stems from the fact that, in the normal mode of operation with zero or reverse bias, the field effect transistor exhibits a high gate input impedance (as of the order of $10^9$ ohms resistance), and when conductive, exhibits between source and drain electrodes a relatively low purely resistive conductive channel impedance (of the order of only hundreds of ohms) for relatively low voltages. Through the rather critical limitation of the operation of the field effect transistors to take advantage of this substantially resistive effect, the field effect transistors are, in accordance with the present invention, used to conduct currents from the composite received signal in either direction in the manner of a resistor, as distinguished from the uni-directional switching action and conduction of diodes or bi-polar transistors of the prior demodulator circuits. Since this effectively variable resistance operation is voltage controlled, the current supplied to the gate electrodes 6 and 6' is insignificant, being substantially less than the signal currents from the composite signal that may pass through the conducting channel of the field effect transistors Q1 and Q2.

To attain this different operation, particularly in view of the fact that the resistance of the field effect transistor channel between its source and drain electrodes is non-linear, but approaches a very high value as the pinch-off voltage is exceeded (usually of the order of 1–6 volts), the value of the oscillations supplied from the reinsert circuit 7 to drive the gate electrodes 6 and 6' must rather critically be adjusted in excess of the sum of the field effect transistor pinch-off voltage and the peak composite received signal voltage that is to be applied through the field effect transistor channels. The effect of operation in this manner results in the multiplex demodulation of stereophonic signals without the composite signal passing through the reinsert oscillator or generator circuit 7, (as in prior switching bridges) or through a multiplicity of diodes, such that the balance of the demodulator circuit, unlike that in the prior diode and bi-polar transistor demodulator circuits, is no longer critical.

Since there is not absolute switching of the type involved with diodes and bi-polar transistors, it has been discovered that no trace of transients in switching from monophonic to stereophonic operation exists in the output circuits A and B as the reinsert voltage provided by oscillator or generator 7 is either applied or removed. When the reinsert voltage is applied to the gate electrodes 6 and 6' by way of forward current blocking diodes D1 and D2, moreover, there is no reinsert signal apparent at these outputs A and B in the absence of any composite signal, such as might exist during pauses of stereophonic broadcast programs. It is, of course, to be noted that in the absence of the reinsert oscillations at gate electrodes 6 and 6', the field effect transistors Q1 and Q2 effectively operate near zero gate voltage and thus pass through the drain-source channel whatever composite signal currents may be available, such as monophonic composite signals. The necessity for dc voltage or current signals for permitting passage of monophonic signals in the absence of stereophonic signals, as is required in prior art circuits, has thus also been eliminated. Consequently, the direct current or direct current transients occurring at the moment of switching from monophonic to stereophonic operation and vice versa have been eliminated as well as the transient of reinsert carrier signal which previously existed in prior demodulators during the simultaneous application of direct voltage and reinsert carrier signal at the moment of switching from monophonic to stereophonic operation.

It should further be pointed out that substantial further advantages fortuitously accrue to this particular kind of critically adjusted use of field effect transistors that cannot be obtained with diodes or bi-polar transistors. The necessity for providing a forward bias current which is required with transistors or diodes to enable the passage of monophonic signals, or the temporary passage of stereophonic signals during the portion of the cycle of the reinsert oscillations which results in conduction of the aforementioned diode or bi-polar transistor are eliminated. Bi-polar and related transistors and diodes, moreover, require rather critical matching in the right and left channel circuits; whereas the above use of transistors with their voltage control operation in accordance with the invention, only requires the peak insert voltage which is in excess of the sum of the peak composite signal voltage and the pinch-off voltage of the field effect transistor Q1 and Q2, whichever has the higher pinch-off voltage.

Figure 2:
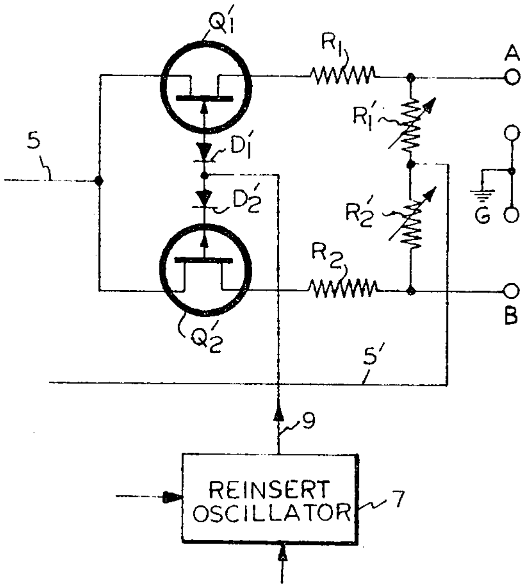
FIG. 2 is a partial circuit diagram of a modified demodulator circuit portion for use in the system of FIG. 1.

Whereas in FIG. 1 the reinsert oscillations are shown applied to the gate electrodes 6 and 6' in push-pull at 9 and 9' to N-channel-junction type field effect transistors Q1 and Q2, the same polarity feed may be provided as at 9 in FIG. 2 if one of the transistors, such as the transistor Q2', is made of the opposite or P-conduction type.

Figure 3:
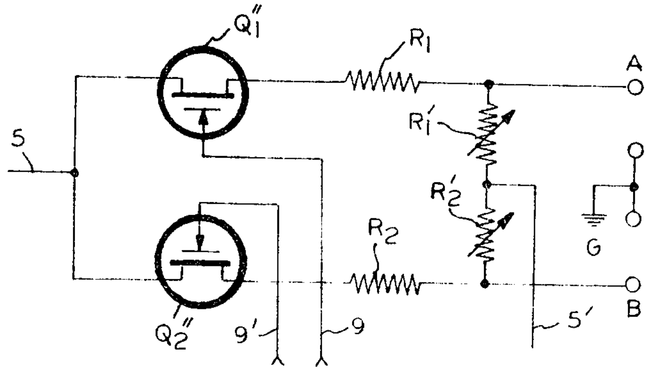
FIGS. 3 and 4 are similar views of further modifications.
Figure 4:
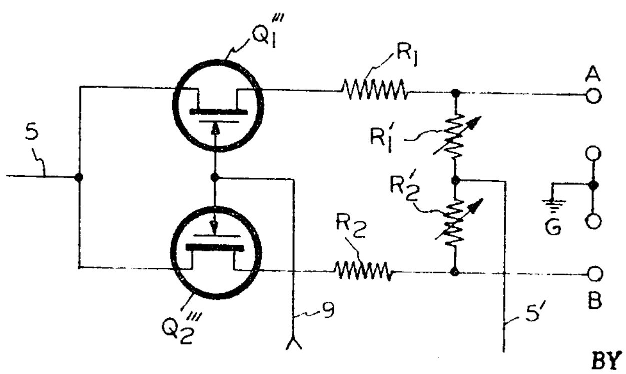

When employing junction-type field effect transistors, as shown in FIGS. 1 or 2, furthermore, care should be taken so that the reinsert voltage does not result in a forward bias of the effective diode provided by the gate electrode and the channel of the field effect transistor. Consequently, diodes D1 and D2 have been provided in FIGS. 1 and 2 to prevent any forward bias of this effective gate-to-channel diode operation. In FIGS. 3 and 4, however, which are modifications of the circuits of FIGS. 1 and 2, insulated-gate transistors Q1''–Q2'' and Q1'''–

Q2''' have been respectively employed which do not require the aforementioned diodes D1 and D2 because the insulation between the gate-conducting channel of these insulating gate transistors does not permit any passage of direct current between the externally accessible gate electrodes and the respective channels. Any forward bias applied to the gate electrode of an insulated gate field effect transistor only results in a further decrease in resistance of the conducting channel and no gate-current frequencies.

Figure 5:
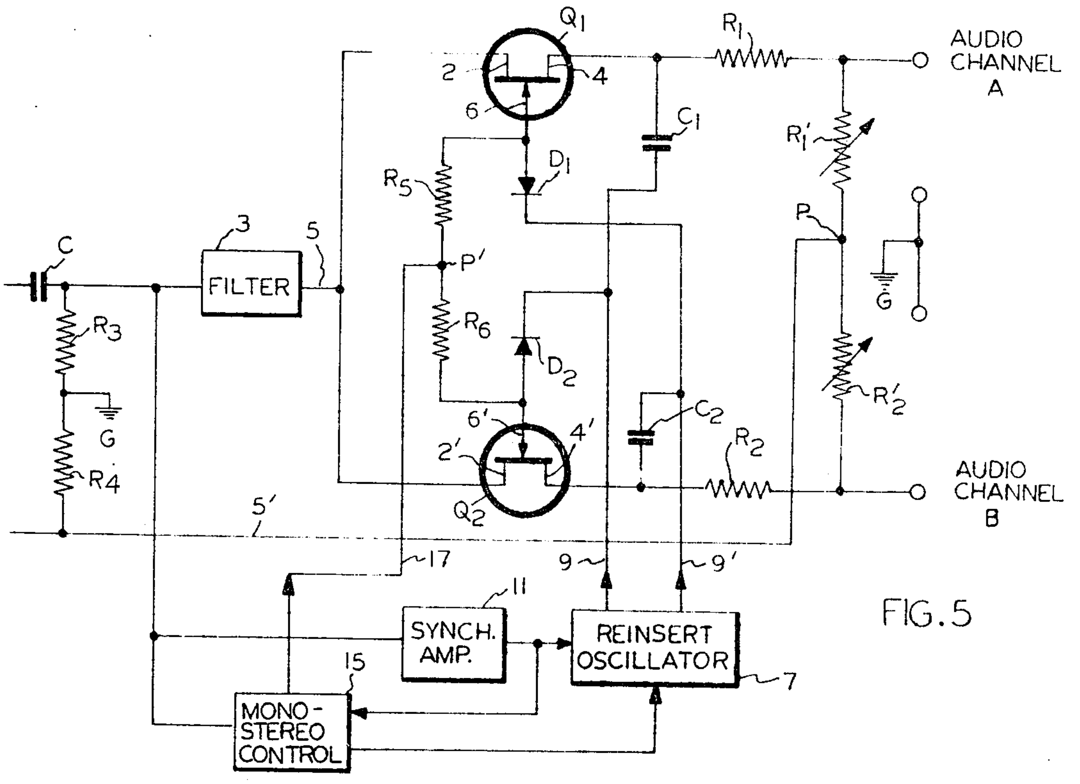
FIG. 5 is a modification of the circuit of FIG. 1 which permits adjustment of the relative monophonic and stereophonic audio output level.

Although stereophonic demodulation and the switching from monophonic to stereophonic operation are without transients in the circuits of FIGS. 1 through 4, there may be a change in program volume level which increases by approximately 6 dB in monophonic operation because field effect transistors Q1 and Q2 conduct approximately one-half the time in stereophonic operation and full time in monophonic operation. A circuit has accordingly been provided in the embodiment of FIG. 5, which is a modification of the circuit of FIG. 1 and wherein this change in monophonic-to-stereophonic audio output level can be controlled to any desired degree. Referring to FIG. 5, it will be observed that two resistors R5 and R6 are connected to the gate electrodes 6 and 6' of the field effect transistors Q1 and Q2, the common junction P' of these two resistors being connected by way of conductor 17 to the monophonic-stereophonic control circuit 15. In the absence of stereophonic signals, this monophonic-stereophonic control circuit 15 supplies a negative direct voltage substantially in excess of the sum of the pinch-off voltage of the field effect transistors and the sum of the peak of the composite signal, thereby preventing any passage of composite signal currents by way of field effect transistors Q1 and Q2 to the audio channel terminals A and B, respectively. The monophonic signal, however, is still supplied by way of conductor 5' and resistors R1' and R2' to the audio channel terminals A and B. Consequently, the monophonic signal level is approximately equal to the composite signal output of the FM tuner 1 existing across resistor R4 of the voltage divider resistors R3 and R4. The stereophonic signal level existing at the audio channel terminals A and B is approximately 10 dB below the composite signal voltage drop existing across resistor R3 in stereophonic operation. By a proper choice of the relative resistance values of resistors R1, R2, R3 and R4, and adjusting resistors R1' and R2' for the required separation of the left and right channel signals, thus, the monophonic-to-stereophonic signal level existing at audio channel terminals A and B may be adjusted over a relatively wide range in excess of 4:1, and may, indeed, be made equal if so desired.

In the stereophonic operation of the circuit of FIG. 5, the direct voltage at conductor 17 becomes essentially zero and the conduction and non-conduction of field effect transistors Q1 and Q2 are entirely controlled by the voltage provided by the insert oscillator 7 by way of conductors 9 and 9' and diodes D1 and D2. If diodes D1 and D2 have a higher leakage current when reverse-biased, suitable values of resistance for resistors R5 and R6 will prevent any deleterious forward voltages from reaching the gate electrodes 6 and 6' of field effect transistors Q1 and Q2, thereby permitting diodes D1 and D2 to have rather broad tolerances.

A small residual portion of the reinsert oscillations fed to gate electrodes 6 and 6' of the field effect transistors Q1 and Q2 may appear at the source electrodes 4 and 4' by way of the interelectrode capacitance between source and gate electrodes of these field effect transistors and having a value typically of the order of a few picofarads. In most instances, the residual reinsert oscillations observable at the audio channel A and B terminals are attenuated by a factor of typically 1000 to 10,000 below that of the voltage provided by the insert oscillator 7. If this very slight amount should still be objectionable, it may be attenuated further by feeding out-of-phase reinsert oscillations by way of capacitors C1 and C2 connected to the source electrodes 4 and 4', FIG. 5, thereby in effect neutralizing the interelectrode capacitance of field effect transistors Q1 and Q2. It should also be appreciated that the very high input resistance of the field effect transistors prevents any observable voltage transients from appearing at the audio channel terminals A and B as the direct voltage on conductor 17 is changed from essentially zero volts to a relatively large negative voltage from stereophonic to monophonic operation. The absence of switching transients appearing at the audio output terminals also permits the use of field effect transistors to mute and thereby switch off all audio output signal.

Figure 6:
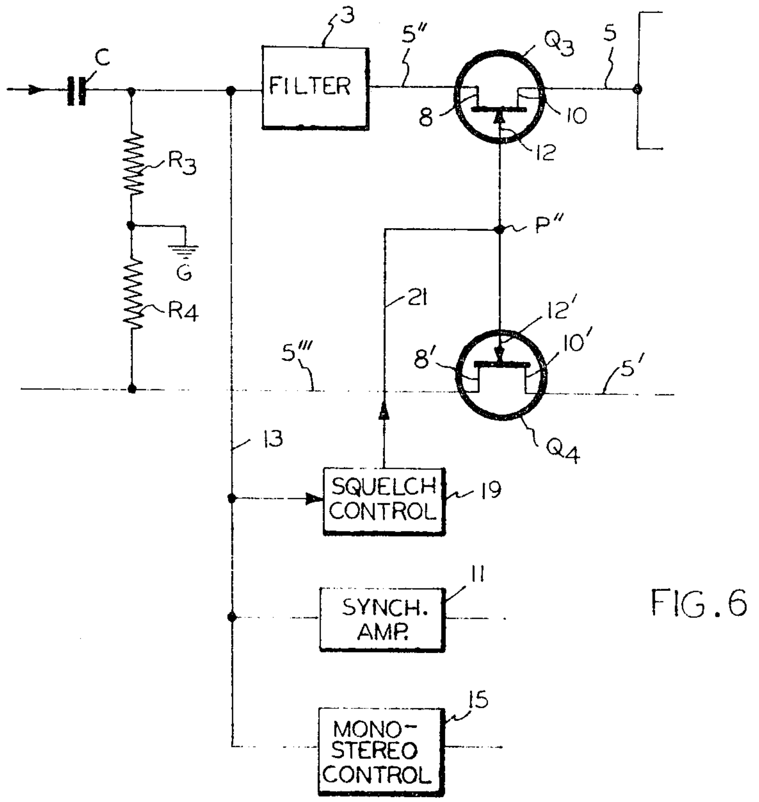
FIG. 6 is a combination block-and-circuit diagram of a muting circuit for use in the present invention.

In the modification of FIG. 6, field effect transistors Q3 and Q4 having drain electrodes 8 and 8', source electrodes 10 and 10', and gate electrodes 12 and 12' are connected between conductors 5 and 5'' and 5' and 5''', respectively, to permit or obstruct the passage of the composite signal and its opposite-phase equivalent to the stereophonic demodulator circuit. Gates 12 and 12' are connected together at P'' and by way of conductor 21 are operated from the squelch control circuit 19, which receives all received composite signals and noise by way of capacitor C and conductor 13 from the FM tuner 1. This squelch control circuit which, for example, may be of the type disclosed in my pending U.S. application Ser. No. 467,585 or any conventional type, extracts all noise above all modulation frequencies and amplifies this noise. When the noise is in excess of a predetermined value, the squelch control circuit provides a negative voltage on conductor 21, this voltage being substantially in excess of the sum of the pinch-off voltage of field effect transistors Q3 and Q4 and the peak of the composite signal. Whenever the noise is less than this predetermined value, conductor 21 is essentially at zero voltage, thereby permitting passage of the filtered composite signal and its out-of-phase equivalent by way of conductors 5 and 5' to the stereophonic demodulator circuit, as, for example, shown in the embodiments of FIGS. 1 through 5.

Figure 7:
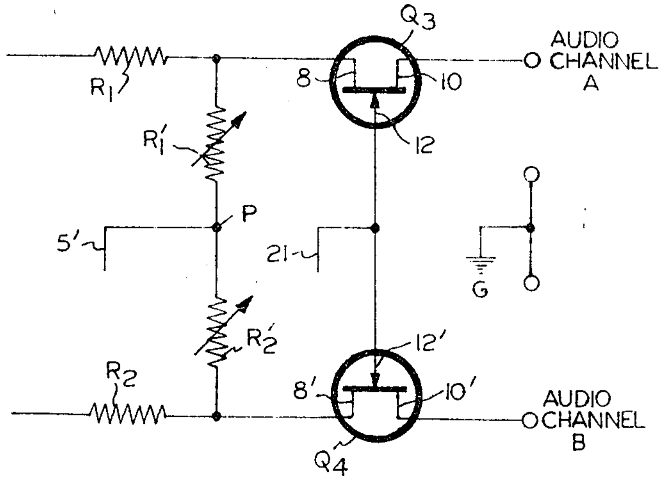
FIG. 7 is a modification of the muting circuit of FIG. 6.
Figure 8:
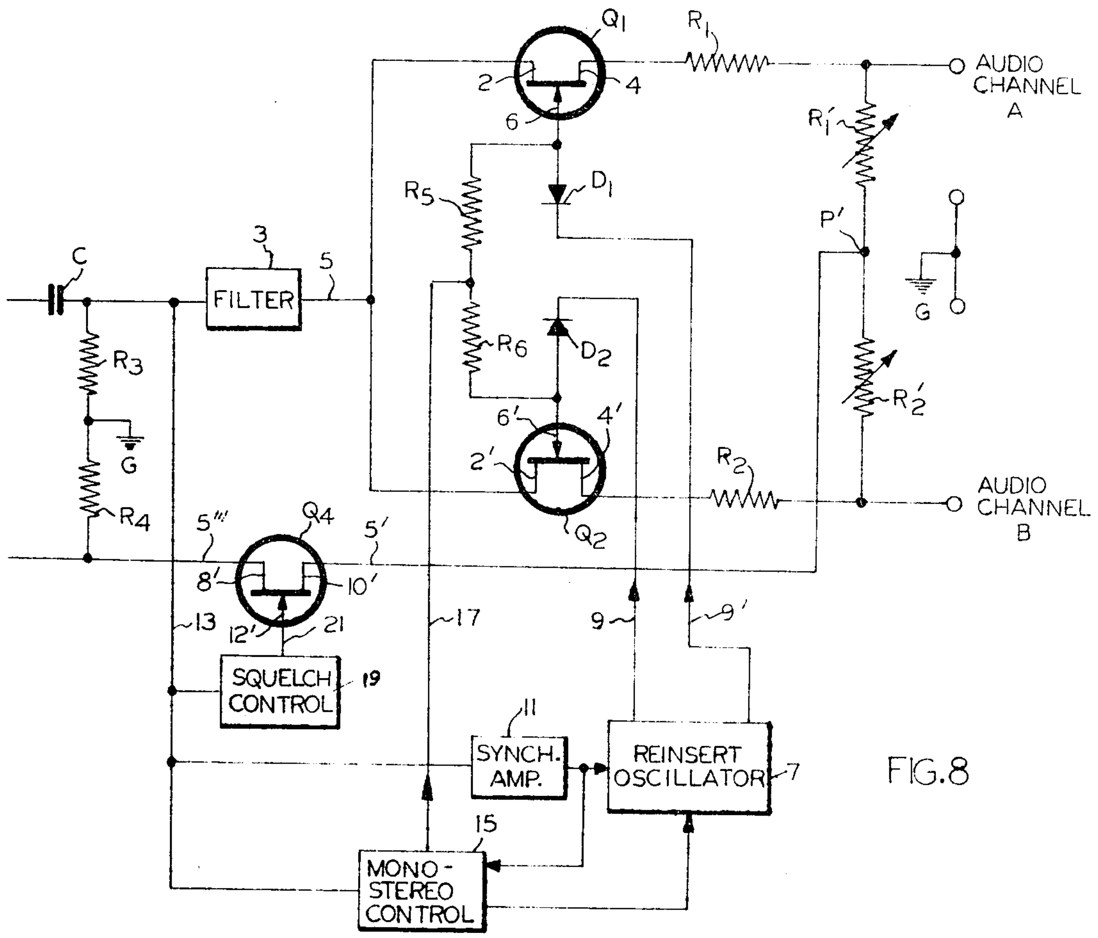
FIGS. 8 and 9 are simplified muting circuits particularly adapted for use in the circuit of FIG. 5.
Figure 9:
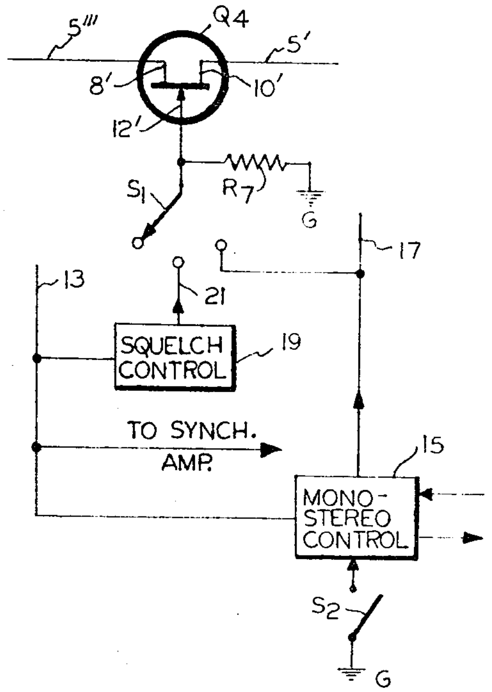

As an alternative, rather than interrupting the composite signal path with field effect transistors Q3 and Q4, these same field effect transistors may be used to interrupt the signal flow from the demodulator, as shown by resistors R1 and R1', R2 and R2', FIG. 7, to the audio channel terminals A and B, respectively. Although the muting or squelch circuits of FIGS. 6 and 7 perform in an excellent manner, they are in some instances somewhat more complex than is actually needed. Upon re-examining the combined block-and-circuit diagram of FIG. 5, it may be realized that in monophonic operation, the signal reaches the audio channel terminals A and B only by way of conductor 5', and stereophonic signals, by way of conductors 5 and 5'. If the monophonic-stereophonic control circuit is of the automatic variety, as, for example, described in my U.S. Letters Pat. No. 3,296,379, the presence of noise above any predetermined level will cause the control circuit to effect the switching of the stereophonic demodulator from stereophonic to monophonic operation. No composite signal, consequently, is permitted to travel by way of conductor 5 to the audio channel terminals A and B during monophonic operation; and only conduction along conductor 5' need be interrupted with a single field effect transistor Q4, as shown in FIG. 8. In this diagram, it is understood that the monophonic-stereophonic control circuit is of such automatic variety and may also be combined with the squelch control circuit 19. The automatic monophonic-stereophonic demodulator circuit combined with the muting circuit and shown in FIG. 8 may be refined to permit additional phases of operation as shown in FIG. 9, wherein portions of the circuit of FIG. 8 are reproduced, but with the addition of two switches S1 and S2 and a resistor R7. Switch S2 interrupts a ground connection G to the monophonic-stereophonic control circuit 15, thereby providing a continued negative voltage along conductor 17 and preventing any stereophonic reception. This may be desirable because, due to the vaguaries of radio-signal propagation and the possibility of broadcast of improper program material, there might be undesired distortion in the left-right portion of the composite signal which might hinder the enjoyment of reception. Upon the desire of the listener, therefore, monophonic reception of a stereophonic signal is possible when switch S2 is opened.

Switch S1 is shown provided with three positions, the first of which is an open circuit. Ground potential is supplied by way of resistor R7 from ground G to the gate electrode 12' of field effect transistor Q4. This switch position permits an override of the muting circuit and enables audible reception of the weakest and poorest FM signals regardless of signal-to-noise ratio, including reception of interstation noise and signals of high quality. The second switch position connects gate electrode 12' to conductor 21 and the squelch control circuit 19. This permits muting of audio signals to the audio channel terminals A and B in the above-described manner, as discussed in connection with the embodiment of FIG. 8. The third position of switch S1 connects the gate electrode 12' to conductor 17 of the monophonic-stereophonic control circuit 15. In this third switch position, a negative potential is supplied to the gate electrode 12 in all modes of reception except when the stereophonic signal is encountered. Since a like direct control voltage is also supplied to the stereophonic demodulator embodying field effect transistor Q1 and Q2, the third position of switch S1 permits reception of stereophonic signals only, and all monophonic signals will be "squelched."

Further modifications will also occur to those skilled in the art, and all such are considered to fall within the spirit and scope of the invention as defined in the appended claims.

What is claimed is:

1. Apparatus for demodulating a received composite signal comprising a main-channel-signal frequency modulated component and a suppressed-carrier-modulated subchannel signal component, said apparatus having, in combination, a pair of audio amplifier channels each provided with input circuits, a pair of field effect transistors each having a gate electrode and source and drain electrodes, one of the latter of which is connected with a corresponding audio amplifier channel input circuit by way of a summing circuit, means for applying the said composite signal to the other of the said latter electrodes of the pair of field effect transistors, the summing circuit being also connected with means for applying said composite signal thereto in opposite polarity to that applied to the said other of the said latter electrodes, a source of reinsert sub-carrier oscillations of frequency corresponding to that of the said suppressed carrier and of voltage value in excess of the sum of the pinch-off voltage of the field effect transistors plus the peak composite signal voltage, means for connecting said source to the gate electrodes of the pair of field effect transistors, means for preventing the application of said oscillations to the said gate electrodes, means for applying a reverse bias voltage to enable said transistors to attenuate said composite signal then received, and means for feeding said composite signal of opposite polarity through said summing circuit, said apparatus being devoid of a DC supply connected to said source and drain electrodes.

2. Apparatus for demodulating a received composite signal comprising a main-channel-signal frequency modulated component and a suppressed-carrier-modulated subchannel signal component, said apparatus having, in combination, a pair of audio amplifier channels each provided with input circuits, a pair of field effect transistors each having a gate electrode and source and drain electrodes, one of the latter of which is connected with a corresponding audio amplifier channel input circuit by way of a summing circuit, means for applying the said composite signal to the other of the said latter electrodes of the pair of field effect transistors, the summing circuit being also connected with means for applying said composite signal thereto in opposite polarity to that applied to the said other of the said latter electrodes, a source of reinsert sub-carrier oscillations of frequency corresponding to that of the said suppressed carrier and of voltage value in excess of the sum of the pinch-off voltage of the field effect transistors plus the peak composite signal voltage, means for connecting said source to the gate electrodes of the pair of field effects transistors, means for adjusting the value of said opposite polarity composite signal to alter the relative ratio of main-channel-signal frequency-modulated component to demodulated sub-channel signal component, said summing circuit and said opposite polarity composite-signal applying means being adjusted to maintain said main-channel-signal frequency-modulated component and said demodulated sub-channel signal component at predetermined relative voltage levels, control means connected with the composite-signal applying means and adjusted to produce no voltage and control voltage outputs in response to monophonic and stereophonic signals, said control means being connected to the said gate electrodes and producing a control voltage in excess of the sum of the pinch-off voltage of the field effect transistors plus the peak demodulated signal voltage to permit passage of the same to the said input circuits in the absence of said control voltage and to block passage of the same in the presence of said control voltage, there being third field effect transistor means responsive to said control voltage, said apparatus being devoid of a DC supply connected to said source and drain electrodes.

3. Apparatus for demodulating a received composite signal comprising a main-channel-signal frequency modulated component and a suppressed-carrier-modulated subchannel signal component, said apparatus having, in combination, a pair of audio amplifier channels each provided with input circuits, a pair of field effect transistors each having a gate electrode and source and drain electrodes, one of the latter of which is connected with a corresponding audio amplifier channel input circuit by way of a summing circuit, means for applying the said composite signal to the other of the said latter electrodes of the pair of field effect transistors, the summing circuit being also connected with means for applying said composite signal thereto in opposite polarity to that applied to the said other of the said latter electrodes, a source of reinsert sub-carrier oscillations of frequency corresponding to that of the said suppressed carrier and of voltage value in excess of the sum of the pinch-off voltage of the field effect transistors plus the peak composite signal voltage, means for connecting said source to the gate electrodes of the pair of field effect transistors, means for adjusting the value of said opposite polarity composite signal to alter the relative ratio of main-channel-signal frequency-modulated component to demodulated sub-channel signal component, said summing circuit and said opposite polarity composite-signal applying means being adjusted to maintain said main-channel-signal frequency-modulated component and said demodulated sub-channel signal component at predetermined relative voltage levels, control means connected with the composite-signal applying means and adjusted to produce no voltage and control volage outputs in response to monophonic and stereophonic signals, said control means being connected to the said gate electrodes and producing a control voltage in excess of the sum of the pinch-off voltage of the field effect transistors plus the peak demodulated signal voltage to permit passage of the same to the said input circuits in the absence of said control voltage and to block passage of the same in the presence of said control voltage, there being means for producing said control voltage in the absence of stereophonic-modulated carrier waves of predetermined value, said apparatus being devoid of a DC supply connected to said source and drain electrodes.

4. Apparatus for demodulating a received composite signal comprising a main-channel-signal frequency modulated component and a suppressed-carrier-modulated subchannel signal component, said apparatus having, in combination, a pair of audio amplifier channels each provided with input circuits, a pair of field effect transistors each having a gate electrode and source and drain electrodes, one of the latter of which is connected with a corresponding audio amplifier channel input circuit by way of a summing circuit, means for applying the said composite signal to the other of the said latter electrodes of the pair of field effect transistors, the summing circuit being also connected with means for applying said composite signal thereto in opposite polarity to that applied to the said other of the said latter electrodes, a source of reinsert sub-carrier oscillations of frequency corresponding to that of the said suppressed carrier and of voltage value in excess of the sum of the pinch-off voltage of the field effect transistors plus the peak composite signal voltage, means for connecting said source to the gate electrodes of the pair of field effect transistors, means for adjusting the value of said opposite polarity composite signal to alter the relative ratio of main-channel-signal frequency-modulated component to demodulated sub-channel signal component, said summing circuit and said opposite polarity composite-signal applying means being adjusted to maintain said main-channel-signal frequency-modulated component and said demodulated sub-channel signal component at predetermined relative voltage levels, control means connected with the composite-signal applying means and adjusted to produce no voltage and control voltage outputs in response to monophonic and stereophonic signals, said control means being connected to the said gate electrodes and producing a control voltage in excess of the sum of the pinch-off voltage of the field effect transistors plus the peak demodulated signal voltage to permit passage of the same to the said input circuits in the absence of said control voltage and to block passage of the same in the presence of said control voltage, said control voltage being developed in the absence of modulated carrier waves of predetermined value, said apparatus being devoid of a DC supply connected to said source and drain electrodes.

5. Apparatus as claimed in claim 1 and in which the source-connecting means comprises diode means connected by conductor means to said gate electrodes with polarity to prevent forward bias of the gate electrode means.

6. Apparatus as claimed in claim 1 and in which the said source-connecting means comprises means for connecting the said source to the said gate electrodes in push-pull.

7. Apparatus as claimed in claim 1 and in which one of said field effect transistors is of the P type, and the other of the N type, and the said source-connecting means connects to the said gate electrodes in the same polarity.

8. Apparatus as claimed in claim 1 and in which means is provided for adjusting the value of said opposite polarity composite signal to alter the relative ratio of main-channel-signal frequency-modulated component to demodulated sub-channel signal component.

9. Apparatus as claimed in claim 1 and in which said reverse-bias voltage-applying means is adjusted to produce a voltage of value in excess of the sum of the pinch-off voltage of the field effect transistors plus the said peak composite signal voltage.

10. Apparatus as claimed in claim 8 and in which said summing circuit and said opposite polarity composite-signal applying means are adjusted to maintain said main-channel-signal frequency-modulated component and said demodulated sub-channel signal component at predetermined relative voltage levels.

* * * * *